United States Patent Office.

JOHN M. STURGEON, OF NEW YORK, N. Y.

Letters Patent No. 71,663, dated December 3, 1867.

IMPROVED SIZING FOR BANK-NOTE PAPER.

The Schedule referred to in these Letters Patent and making part of the same.

TO ALL WHOM IT MAY CONCERN:

Be it known that I, JOHN M. STURGEON, of the city, county, and State of New York, have invented a new and useful Sizing for Bank-Note Paper; and do hereby declare that the following is a full, clear, and exact description thereof, which will enable others skilled in the art to prepare and use the same, viz:

This invention relates to the preparation of a sizing for bank-note paper, national currency, bonds, bank-bills, bills of exchange, and fractional currency, which will render them comparatively fire-proof, and absolutely proof against counterfeiting.

This sizing is prepared by combining the ingredients according to the following formula: Gum-dragon and albumen, equal parts; table-salt, sufficient for consistency; carbonate of soda, carbonate of potassa, silica, dissolved, and the quantity requisite added.

The above combination renders the note perfectly and completely secure from counterfeiting, from the fact that in its manipulation, out of the five or six colors the note may contain, two will be left fugitive, so that when a counterfeiter softens the note so prepared in an alkali, which he must do to get a perfect register, the two fugitive colors will float off in solution, and are uncontrollable by him.

Having thus described my invention, what I claim and desire to secure by Letters Patent, is—

A sizing, made from the within formula, substantially as described, and combined for the purposes set forth.

In testimony whereof, I have hereunto set my hand and signature.

JNO. M. STURGEON.

Witnesses:
FRANK S. TAFT,
ARNO R. DOUAI.